United States Patent [19]

Papa et al.

[11] 4,425,938
[45] Jan. 17, 1984

[54] LOW PRESSURE SAFETY RELIEF VALVE

[76] Inventors: Donald M. Papa, P.O. Box 1475, Bellaire, Tex. 77401; Walter W. Powell, 8914 Valley View, Houston, Tex. 77074

[21] Appl. No.: 355,131

[22] Filed: Mar. 5, 1982

[51] Int. Cl.³ .................................... F16K 31/363
[52] U.S. Cl. ............................ 137/489; 137/492; 137/495
[58] Field of Search ............... 137/489, 492, 492.5, 137/495

[56] References Cited

U.S. PATENT DOCUMENTS

| 3,664,362 | 5/1972 | Weise | 137/492 X |
| 4,083,375 | 4/1978 | Johnson | 137/489 X |
| 4,172,466 | 10/1979 | Pattarini | 137/489 X |

*Primary Examiner*—Alan Cohan

[57] ABSTRACT

In the preferred and illustrated embodiment, a low pressure safety relief valve and pilot for the safety relief valve is particularly adapted for use with steam. The pilot incorporates two diaphragms, one being a sense diaphragm responding to a pressure setting opposed by an adjustable spring, and the second being a boost diaphragm which assists opening of the pilot to a fully open position. The pilot includes an inlet supply passage communicating first through an adjustable and then a fixed orifice to define controllable pressure drops, and forms a control pressure applied to the dome of the safety relief valve. The dome pressure closes a movable piston, subject to differential areas. The safety relief valve is opened by dropping dome pressure at such time as the safety relief valve is controllably opened. The pilot valve, being equipped with a sense diaphragm and selectively boosted by a differential force acting across the boost diaphragm, drops the dome pressure, by venting to atmosphere. An important feature in the safety relief valve and the pilot valve is the incorporation of suitable steam traps to prevent blockage by condensed steam, and damage even in the event of freezing.

14 Claims, 4 Drawing Figures

LOW PRESSURE SAFETY RELIEF VALVE

BACKGROUND OF THE DISCLOSURE

This disclosure is directed to a pilot operated safety relief valve particularly adapted for handling steam. The safety relief valve of this disclosure in conjunction with the pilot valve provided therefor is particularly useful with steam. The three phases of water become important in the operation of the safety relief valve. The ordinary circumstance requires that the valve handle steam. There is some possibility that water will accumulate in the safety relief valve or the pilot valve as steam condenses. The condensed steam is permitted to trickle along passages of the pilot valve or through the safety relief valve. This is particularly helpful in that steam is ordinarily flowed through two or three passages in both valves and any condensate which forms on the inner surfaces of either valve is permitted to trickle along the passages where the steam flows.

Condensate handling is particularly important in the pilot valve. The pilot valve is typically small in scale, made with small passages, and is often located at the extreme end of equipment, and often exposed to freezing weather. In fact, the formation of ice in the pilot valve is a real possibility should the temperature on the exterior drop sufficiently. The pilot valve is constructed and arranged to receive steam as the operative fluid. The heat from the steam actually liberated at the pilot is somewhat small inasmuch as the rate of steam flow (and related heat transfer) through the pilot valve is relatively small. The heating of the pilot valve is, therefore, minimal and chilling by the outside air is a real possibility. This is a variable dependent on the circumstances of installation, including exposure to inclement weather, prevailing winds and other factors.

The pilot operated safety relief valve is not immune to inclement environmental conditions, namely chilling from inclement weather which leads to the formation of condensate. In ordinary applications, the safety relief valve is practically closed. In the closed condition, the flow of steam through the valve is markedly reduced. This exposes it to greater formation of condensate. The apparatus is constructed with an isolated dome area. This area is particularly exposed to the risk of condensation because it is located at the end of a long flow path with little flow. The system, therefore, incorporates passages constructed to bleed condensate from the dome area back into the main line. This arrangement enables gravity flow of condensate from the dome into the main line. This condensate flow reflects a loss of steam volume and tends to increase the rate of flow of steam to the dome, and thereby raises the heat content delivered to the pilot valve and to the safety relief valve. A balance is achieved dependent on prevailing temperatures, the steam flow rate, and other scale factors.

Occasionally, it will be necessary to shut down the equipment. On the loss of steam for any reason, the equipment of this disclosure is exposed to the risk of freezing. Assuming that both the pilot valve and the safety relief valve are shut down in freezing weather, the condensate will freeze if the shut down persists for an adequate time to permit freezing. The apparatus is constructed and arranged to tolerate freezing. For instance, in the safety relief valve, freezing steam in the dome area may form a plug of ice. Even so, the ice is located so that it does not expand to thereby damage the valve structure. Should there be ice accumulated in either, the introduction of steam simply melts the ice and the problem is self-correcting.

While these and other features of the valve system of the present invention have been discussed, they will be more readily apparent from a consideration of the preferred embodiment which is summarized as a pilot operated, steam relief valve and associated pilot valve operating together. The system is particularly adapted to operate with steam. The safety relief valve incorporates a piston which closes against a valve seat, being driven by differential areas, one area being exposed to line pressure, and a larger area being exposed to pressure in a dome. The dome is connected by means of a control line to the pilot valve which is also provided with line pressure as an input. The pilot valve incorporates multiple diaphragms, one being a pressure sensing diaphragm, and the other being a boost diaphragm which assists the pilot in snap action to open. Further, the pilot valve is able to controllably respond to pressure change by means of an adjustable orifice, and also includes a second orifice which is fixed. The pilot diaphragm sensed response is a function of the control spring working against the sense diaphragm and the setting of the adjustable orifice. Other details, advantages and features of the apparatus will be understood on review of the detailed specification found below.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF PREFERRED EMBODIMENT

Figure 1:
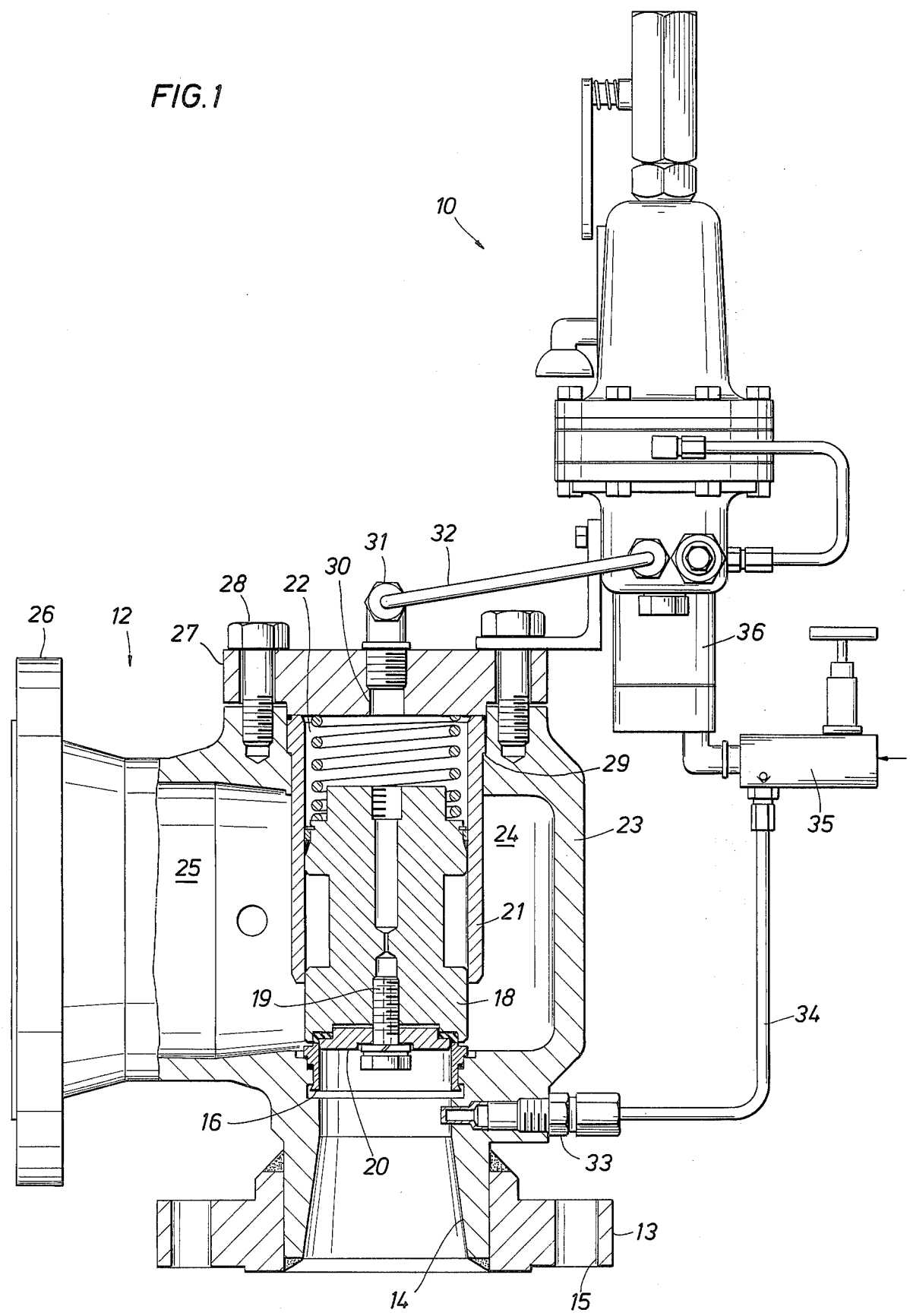
FIG. 1 discloses the pilot operated safety relief valve partly in section.

Attention is directed first to FIG. 1 of the drawings. FIG. 1 discloses a safety relief valve 12. The valve 12 is controlled in its operation by a pilot valve 10. The pilot valve controls operation of the safety relief valve. Focusing at the beginning on the safety relief valve 12, its operation will be described first. After that, the construction of the pilot valve will be set forth and its operation will be correlated to the operation of the safety relief valve 12.

SAFETY RELIEF VALVE

The safety relief valve is adapted to be connected with a flow line from a large fluid source and in this instance, it is typically steam. It is connected with a line at a flange 13 which is welded around an inlet manifold 14. The flange is fastened to the line by means of bolts positioned in bolt holes 15 located on a common bolt circle. The inlet manifold 14 communicates axially through the center of the apparatus to a removable valve seat assembly 16. The valve seat assembly 16 is constructed with a cross-sectional area through the central passage which defines a first area. A piston 18 is movably mounted within the relief valve 12, and supports a bolt 19 which clamps a disc 20 in place. The disc 20 defines a specified cross-sectional area exposed to line pressure. This creates a force acting on the valve body. The disc 20 is a clamp securing a a resilient fluorocarbon seat ring in a confined circular groove around the disc 20 at its peripheral edge. The ring is sized to fit snugly against the cooperative valve seat assembly 16 which encircles the disc 20. The captured seat ring is heat deformable. At increased temperatures and pressures, it tends to flow. The disc 20 clamps the ring in place and the flow of the ring is therefore limited. In face, the ring is so confined that it presents a cooperative face to the seat 16, even at high temperatures.

The disc 20 is exposed to line pressure. A force acting upwardly in FIG. 1 pushes the disc 20 and the connected piston 18 toward the open position. It will be observed that the piston 18 is guided in a sleeve 21. The sleeve confines its upward movement. The sleeve 21 defines a cross-sectional area which is larger than the area of the disc 20. This area is found within the sleeve 21 and coincides with the cross-sectional area of the piston 18 at the upper end. This effective area at the top end of the sleeve defines a force acting downwardly on the piston. The area above the piston is defined as the dome 22. In the preferred embodiment, this is a closed chamber having a larger cross-sectional area than the area of the disc 20.

The dome is a closed chamber with a condensate drain just described. As steam is introduced under pressure into the dome 22, the piston 18 is forced downwardly. The piston is, therefore, exposed to opposing forces. If the steam pressures at both ends of the piston are equal, the piston is inevitably forced downwardly because the top face of the piston 18 is larger than the lower area 20. This maintains the piston in the closed position of FIG. 1. Closure is accomplished by this pressure differential. Opening is a result of a force imbalance between the two pressures sufficient to overcome the differential area. The bolt 19 is hollow to define a water drain passage through the piston. The passage is from one face to the other; the passage enables gravity flow of water droplets along the passage. Even so, the passage is narrow to avoid equalizing the pressure across the piston 18. The passage is wider at the top end to collect water above the narrow portion.

The sleeve 21 is an insert within a body 23. The body 23 is enlarged to define an encircling donut shaped cavity 24. This opens into an outlet 25. The outlet 25 is attached by means of a flange 26 to suitable downstream piping or the like. Typically, the exhausted steam flows through the outlet 25 into a downstream line for easy disposal.

The valve body 23 is open at the upper end. It is counterbored to define a circular opening for receiving the sleeve 21 into the chamber 24. That is closed over by means of a dome head 27. The dome head 27 is joined to the valve body 23 by means of suitable dome bolts 28. The dome head 27 jams against the sleeve 21 and a seal between the two is perfected by means of a surrounding O-ring or other seal member. The sleeve 21 is locked in position by means of an overhanging shoulder 29.

SAFETY RELIEF VALVE CONNECTIONS

The dome head 27 is drilled at 30 to receive a fitting 31. The fitting 31 enables connection to a control line 32. The control line extends to the pilot valve 10. The pilot valve 10 is additionally furnished with a second line. In FIG. 1, a fitting 33 joins to a line 34 extending to the pilot valve. The fitting 33 is received into a tapped port or opening, and steam is delivered at supply pressure or line pressure for the line 34. The pressure in the line 34 is the pressure observed by the safety relief valve. It is this pressure level which is regulated by the valve 12 under control of the valve 10.

The valve 10 is connected to the line 34 through a field test valve 35 also including an internal check valve limiting flow in the line 34 to one direction. The valve 35, in turn, delivers the steam through a filter 36. The steam is then input to the valve 10 as will be described.

PILOT VALVE

Figure 2:
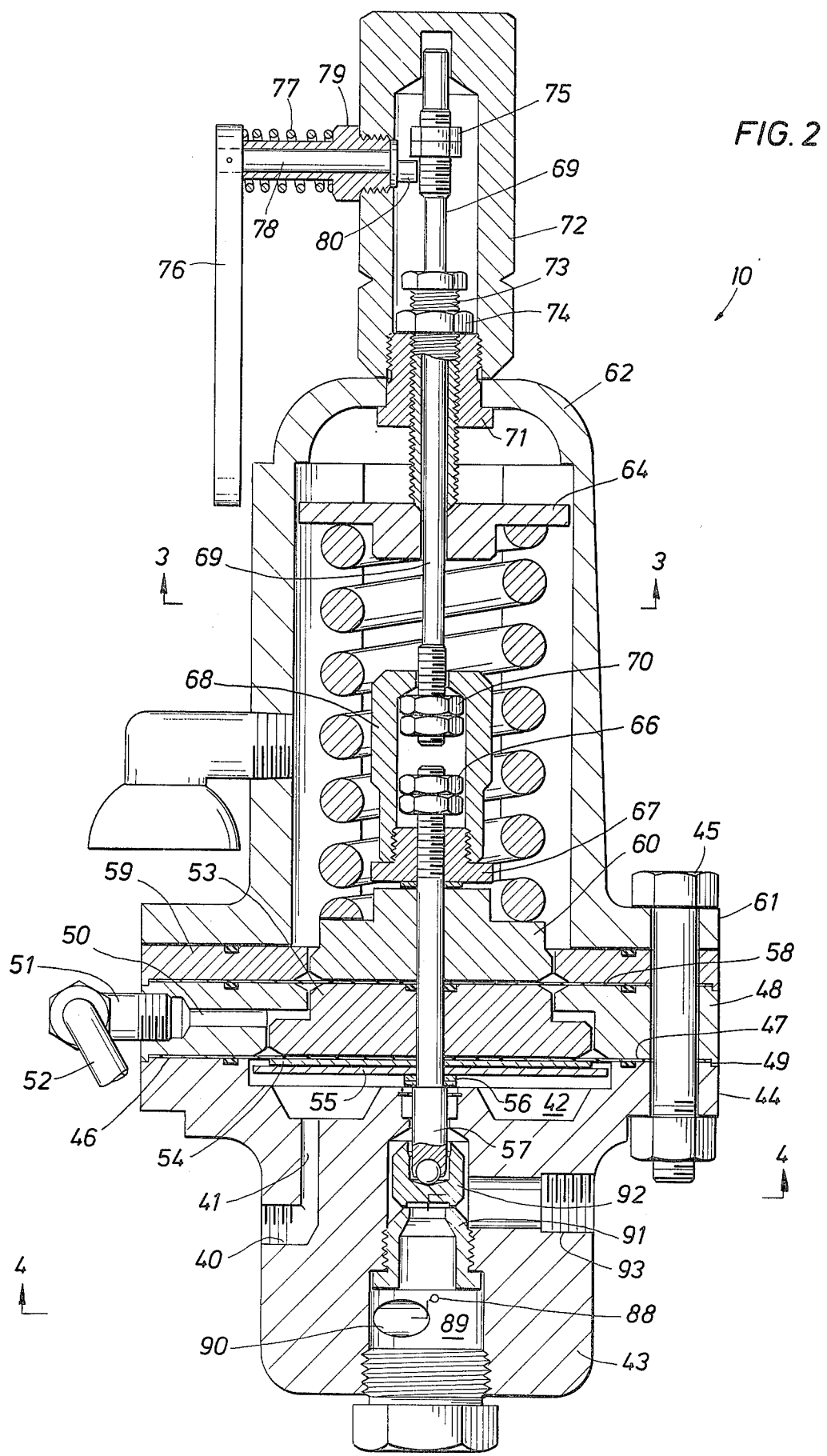
FIG. 2 is a sectional view through the pilot valve showing internal details of construction.

Attention is next directed to FIG. 2 of the drawings which shows the pilot valve 10 in greater detail. The apparatus will be described referring primarily to FIG. 2. After description of that view, the description will be completed by reference to FIG. 4. Thereafter, the operation of the device will be set forth. The description of FIG. 2 begins at the bottom.

DIAPHRAGM CONSTRUCTION

The numeral 40 identifies a tapped opening which is adapted to be connected with a line providing inlet pressure. Inlet pressure is the pressure observed at the inlet of the safety relief valve 12. The line 34 delivers this pressure to the filter 36 previously mentioned, and then to the opening 40. The tapped hole 40 is connected with a passage 41. The passage 41 extends to an internal donut shaped cavity 42. The cavity 42 is formed in a lower valve body 43. The valve body 43 terminates in an encircling flange 44 which is joined to other flanges to be described by suitable nuts and bolts 45. The valve body 43 terminates at an upwardly facing flat face 46, and a polymeric diaphragm 47 is placed adjacent to the face 46. The diaphragm 47 is known as the boost diaphragm. It is pinched between the flanged valve body 43 and a flat plate 48. The plate 48 has parallel upper and lower faces which are caught between flange plates as shown in FIG. 2.

Figure 4:
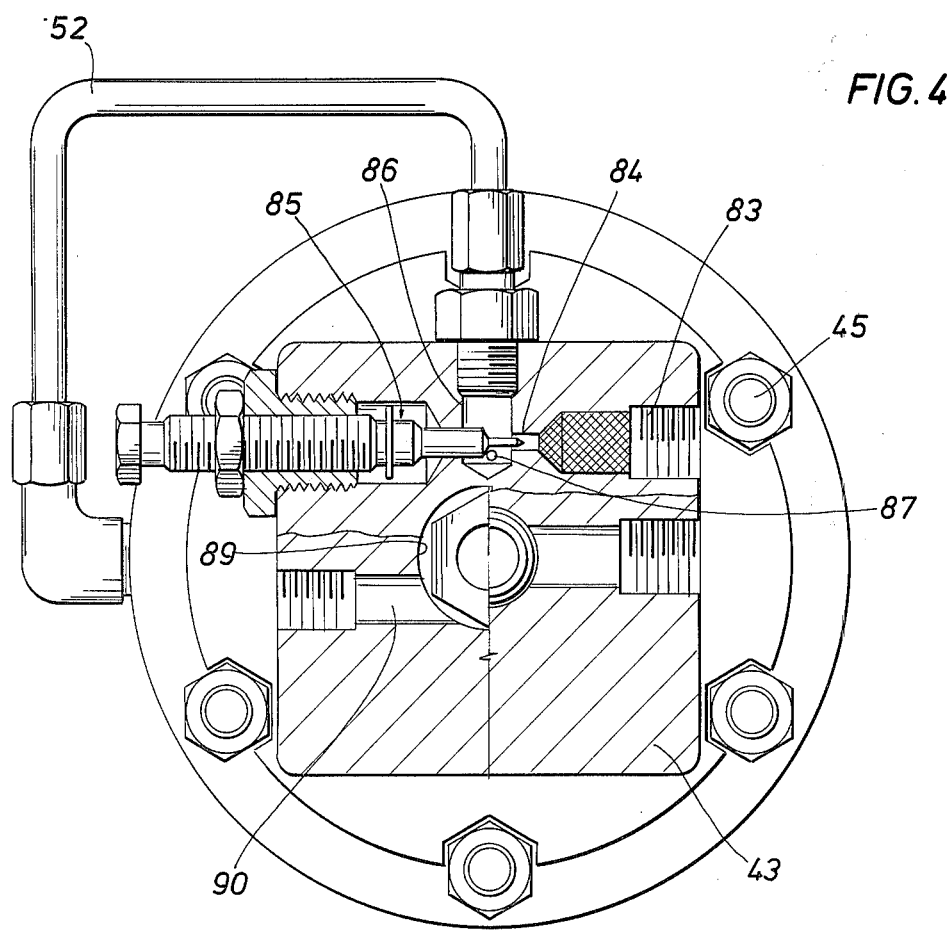
FIG. 4 is a sectional view taken along the line 4—4 in FIG. 2 illustrating details of construction of the needle orifice and valve construction for the exhaust port in the pilot valve.

The plate 48 is centrally hollow. Moreover, it is constructed with a surrounding outer lip 49 to mate with a corresponding groove on the face 46. The lip and groove lock the diaphragm 47 in position. Suitable seals are included to prevent leakage across the diaphragm periphery. Moreover, the flat plate 48 is drilled with a passage 50 which opens into a fitting 51 by suitable threads. The fitting 51 communicates with a flow line 52. The flow line 52 is also shown in FIG. 4.

The diphragm 47 abuts against a central plate of circular configuration, having a common thickness as the plate 48, which is hereinafter referred to as a pressure plate. It is identified by the numeral 53. The plate 53 is snugly received within a counterbored centrally located hole in the plate 48, and is able to move upwardly and downwardly through a limited range. Lateral movement is limited by the radial tolerance permitted between the hole surrounding the plate 53. Such lateral movement is relatively limited. The passage 50 opens to the top side of the diaphragm 47. It enables steam to be introduced on the top face of the diaphragm 47. The bottom face of the diaphragm is supported by a backing plate 54. The plate 54 is supported on a slightly larger circular plate 55. The plate 55 is, in turn, supported on a central washer 56. The washer 56 is received on a shoulder on a valve stem 57. The valve stem 57, on upward movement, carries the washer with it, and this movement, in turn, is imparted to the backing plate 54, the diaphragm 47 and the circular pressure plate 53.

The stem 57 passes through a hole in the diaphragm. To this end, double or triple washers are used at 56 to adjust the undeflected position of diaphragm 47 to a horizontal plane. Moreover, the diaphragm 47 is clamped by the opposing members and leakage along the stem is prevented.

The diaphragm 47 is a boost diaphragm. It responds to a pressure differential. Line pressure is applied to the lower side. This is the maximum pressure observed in the pilot valve 10. A reduced pressure is introduced through the passage 50 on the top face of the diaphragm. This reduced pressure is from a source (to be described) within the pilot valve.

The plate 48 abuts a second diaphragm 58. The diaphragm 58 is the sense diaphragm. The diaphragm 58 is caught below a similar circular flat plate 59. The plates 59 and 48 lock together at an encircling groove and lip. This restrains the diaphragm 58. The diaphragm 58 is abutted against a thrust washer 60. The washer 60 is circular, and fits within a circular opening in the plate 59. The similarly shaped opposing members 53 and 60 have only a small radial clearance. They are both chamfered adjacent to the diaphragms to permit bending or flexure of the diaphragms without cutting at the edges. Both diaphragms are preferably made of a material capable of handling high pressure and temperature, and typical materials include various grades of Teflon including TFE or FEP Teflon. Whatever the choice, the polymeric diaphragm material must flex, bend and even flow under pressure while maintaining a leakproof construction.

The opposing, circular, plate shaped members 53 and 60 abut against the diaphragm 58. They transfer forces to one another depending on the force balance across the diaphragm. The plate 60 imparts a force to the diaphragm which is a function of a spring as will be described. The plate 53 imparts a force which is a function of area and pressure. The pressure is that introduced through the passage 50. It is intermediate pressure as will be described.

BONNET CONSTRUCTION

The numeral 61 identifies a flange on a bonnet 62. The bonnet 62 surrounds and encloses a coil spring 63. The coil spring 63 bears against the lower thrust washer 60 at a suitable top located shoulder. The spring 63 is caught between the bottom washer 60 and a topmost washer 64. The washer 64 compresses the spring. The spring surrounds the stem 57 which extends through the plates 53 and 60. The stem fits loosely relative to the backing plates 53 and 60, but leakage along the stem is prevented by the washers at 56, and also by seals at other locations along the stem. The stem 57 terminates at a threaded upper end, and suitable lock nuts 66 are threaded on the stem. They lock against one another to prevent accidental rotation, and they also secure a hollow externally threaded nut 67. The nut 67 is threaded to the stem and locks against a washer above the disc 60. The threaded nut 67 joins to a small hollow cap 68 which encloses the top end of the valve stem 57. The cap 68 is internally hollow and sized to receive a pull rod 69. The rod 69 terminates in a set of threads and suitable nuts 70 are locked against one another to prevent accidental rotation and are sized to be captured within the cap 68. The pull rod 69 is able to raise the stem 57 by coupling motion through the cap 68 and then to the threaded nut 67 therebelow.

At the top end of the bonnet, a hollow threaded plug 71 is positioned in an axial opening and threads to an external cap 72. The cap is hollow and encloses the upper end of the rod 69. The rod 69 is included for pulling the valve stem 57 momentarily upwardly. The rod 69 aligns a hollow threaded sleeve 73. The sleeve 73 threads on its exterior to the hollow plug 71. The sleeve, in turn, encloses the pull rod 69 and telescopes along it to permit relative movement. The threaded sleeve 73 is locked in position by means of a suitable lock nut 74, and terminates at a tapered face which nests against a mating face in the top spring washer 64. The washer 64 is forced downwardly by the threaded sleeve 73. Conversely, the coil spring forces the top spring washer 64 upwardly in response to urging of the spring if the threaded sleeve 73 is backed off. Of course, it is normally locked in position. The spring force is adjusted by raising or lowering the threaded sleeve 73.

The pull rod 69 terminates in a set of threads at its upper end and suitable lock nuts 75 are fastened at a selected elevation along its length. A hand crank 76 rotatable against resistance of a spring 77 on an arm 78 guided within a fixed sleeve 79 rotates an eccentric 80 to lift the pull rod 69. The eccentric is in the down position in FIG. 2. When rotated, it bumps against the nuts 75 and raises the pull rod 69. That, in turn, raises the cap 68. That, in turn, pulls on the stem 57 and opens the pilot valve 10. Details of construction of the valve elements are given below.

Figure 3:
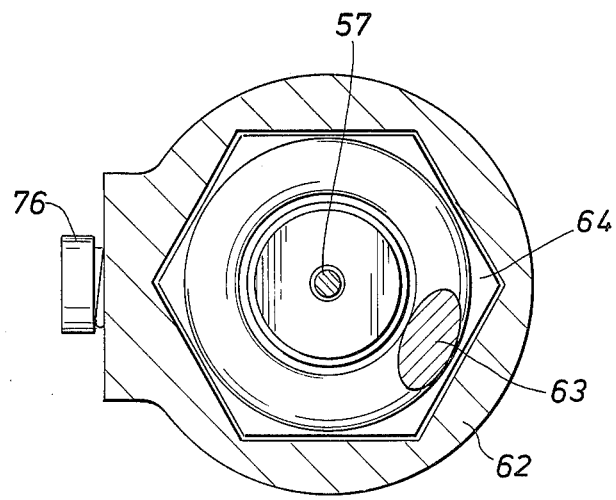
FIG. 3 is a sectional view along the line 3—3 of FIG. 2 setting forth details of a top spring washer which is prevented from rotating by the hex construction.

Additional details regarding the bonnet are shown in FIG. 2. It is open to atmosphere. Moreover, this indicates that the pressure differential acting across the diaphragm 58 is the control pressure which is provided through the line 52 as will be described. This is opposed by atmospheric pressure on the top face of the diaphragm which, being negligable by contrast, can ordinarily be ignored. However, atmospheric pressure becomes significant as the pressure on the lower face of the diaphragm 58 decreases. The force created on the lower side of the diaphragm is opposed by the adjustable force of the coil spring 63. This force is adjusted by altering the location of the threaded sleeve 73. It will be recalled that it is raised and lowered by rotation with the lock nut 74 fixed in position to prevent backing. Another detail of some note regarding the apparatus in the top portion of FIG. 2 is the construction of the top spring washer 64. Its outer profile is shown in FIG. 3. It is preferably formed of hex material, and is received within the surrounding bonnet 62. The bonnet 62 is internally shaped with a matching hex construction. The matching hex prevents rotation of the top spring washer 64.

PRESSURES AND FORCES RELATING TO OPERATION

As described to this juncture, the valve stem 57 has been equipped with the sense and boost diaphragms which selectively pull the valve stem upwardly. The structure to be described in this disclosure sets forth the valving action. This can be understood best by beginning with the introduction of the supply pressure line into the arrangement of FIG. 4. It will be observed that FIG. 4 is a sectional view taken through the valve body 43 in FIG. 2. Of particular interest is the fact that the section line for this particular view is split. The top portions of FIG. 4 depict a needle orifice assembly which is located on the far side of the valve body 43 as viewed in FIG. 2. Moreover, it is at an elevation coinciding with the exhaust port as will be described. There is, however, a lower portion of the sectional view in FIG. 4 which incorporates the dome pressure passage, and that is offset as indicated by the break in the section line on FIG. 2.

ADJUSTABLE NEEDLE ORIFICE

The numeral 83 identifies the pressure inlet port. This is the port where line pressure is input. Line pressure is also input to the tapped opening 40 on the opposite side of FIG. 2. The line is threaded to the internally tapped port 83, and steam flows through the port and through an optional strainer which is located within the port. The steam flows through a first orifice 84. The orifice 84 is an adjustable orifice. A needle adjustment 85 is also included. The needle adjustment includes an external hex head bolt which threads into an internally tapped fixed fitting. By rotation, the position of the needle adjacent in the orifice passage is controlled. It is positioned and locked in position by means of a suitable lock nut on the exterior of the valve body 43. This locking action is useful in fixing the amount of pressure drop which occurs across the adjustable orifice 84. The needle adjustment alters the flow capacity of the adjustable orifice. Accordingly, the pressure at the inlet 83 is always larger than the pressure downstream from the orifice 84. If there is no flow, the downstream pressure will rise to the line pressure; otherwise, the orifice always drops the downstream pressure.

The pressure at the inlet 83 is termed line pressure. The pressure after flowing through the orifice 84 will be termed the intermediate pressure. The intermediate pressure is supplied by the line 52 shown in FIG. 4 to a point between the two diaphragms 47 and 58 in FIG. 2. Their operation, with this pressure, will be described in detail hereinafter. The intermediate pressure is observed in a chamber 86 within the valve body 43.

A small passage 87 is drilled from the chamber 86 downwardly. The passage 87 extends downwardly in the valve body 43 and has an opening 88. This is better shown in FIG. 2 where the opening 88 is located within a closed chamber 89. The chamber 89 is closed from the bottom by a threaded plug. The chamber 89 is formed by drilling an axial hole through the valve body 43 with appropriate countersunk shoulders. It is aligned with the valve stem 57. Moreover, the chamber 89 is maintained at a reduced pressure. Recalling that the maximum pressure is line pressure which is input through the port 83 shown in FIG. 4, and the intermediate pressure is obtained by pressure drop at the first orifice, the small passage 87 is sufficiently small to constitute a second orifice. It forms the control pressure. The control pressure is less than the intermediate pressure. The only time that it is equal to the intermediate pressure is when there is no flow. Control pressure is observed in the chamber 89.

The chamber 89 communicates with the dome of the safety relief valve 12. A passage 90 having threads at the outer end is shown in FIG. 4 to open into the chamber 89. The passage 90 thus communicates control pressure to the dome of the safety relief valve through a suitable connective line such as the line 32 shown in FIG. 1.

EXHAUST PORT CONSTRUCTION AND OPERATION

The pressure within the chamber 89 is control pressure observed at the dome. This pressure rises close to line pressure and thereby maintains the safety relief valve in the closed condition.

Returning now to FIG. 2 of the drawings, the chamber 89 is closed over at the top by means of a valve seat assembly 91. The valve seat assembly 91 is a hollow threaded thimble. It is externally threaded and is, therefore, fixedly received on the interior of the chamber 89 as illustrated. It is hollow, having an upper lip about its top end which functions as a valve seat. A valve element 92 closes against it. The valve element 92 has a matching downwardly protruding peripheral lower lip. On contact, the valve element closes against the valve seat. The valve element has an external shape which is generally cylindrical. Moreover, it is mounted at the lower end of the valve stem 57 and is supported against it by means of a sphere. The sphere enables rotation and functions in the manner of a universal joint. It thereby accommodates canting and misalignment. On closure, the metal element 92 closes against the metal seat 91 and prevents fluid flow therepast. If the stem is raised, steam will flow upwardly past the valve seat 91 and force the valve element upward so long as the stem is raised. It flows to the exterior through an exhaust port 93. This opens to atmosphere and is therefore the lowest pressure observed in the pilot valve 10.

SUMMARY OF OPERATIVE FORCES

In summary, the pressure observed within the pilot valve beginning at the inlet pressure port 83 are line pressure, intermediate pressure, control pressure, and exhaust pressure. The manner in which these pressures are used in conjunction with the diaphragms will be described.

Returning now to FIG. 2 of the drawings, the valve stem 57 is subjected to four forces. One force is applied by the coil spring 63 which forces the valve stem 57 downwardly in FIG. 2. This force tends to close the valve. A second force is formed by the sense diaphragm 58. This force is an upward force assuming that the intermediate pressure is above atmospheric pressure, a condition which routinely prevails. A third force raising the valve stem is the pressure differential acting across the diaphragm 47, the boost diaphragm. This force is dependent on the differential between line pressure and the intermediate pressure. This force generally tends to open the valve by lifting the valve stem 57. Control pressure is applied to the bottom face of the valve element 92. It creates a force which is proportional to the control pressure and the exposed cross-sectional area of the valve element. It tends to force the valve stem upwardly, thereby opening the valve element 92.

The four forces described above modulate the position of the valve stem 57. The valve element 92 is held closed only if there is sufficient force on the valve stem 57 to accomplish this. Thus, when the valve stem pulls upwardly to disengage the valve element 92, the valve element 92 is inevitably forced upwardly, and positive engagement between the valve stem 57 and the valve element 92 is maintained.

MODE OF OPERATION OF THE PILOT VALVE 10

Consider an example of operation of the pilot valve 10. Assume, as an initial condition, that the safety relief valve is closed. Assume further that external weather conditions are not freezing and do not create an excess of condensate within the valve 10. Line pressure is applied to the lower side of the boost diaphragm 47. Assume that line pressure is 1,000 psi. In like fashion, line pressure at 1,000 psi is input to the port 83 shown in FIG. 4. Assume further that the setting of the adjustable orifice 84 and the flow rate of steam past the orifice is such that the intermediate pressure is 950 psi. The intermediate pressure is applied to the top of the diaphragm 47. The boost diaphragm has a specific and unchanging surface area exposed to a pressure differential of 50 psi in the example given. This pressure differential creates an opening force. Moreover, the sense diaphragm 58 has a specific and fixed cross-sectional area which is also exposed to a pressure differential. In this instance, the differential is approximately 950 psi, ignoring atmospheric pressure. It will be recalled that the sense diaphragm is exposed to the intermediate pressure and atmospheric pressure. This pressure differential also creates an opening force. Assume further that the flow of steam is sufficient that the narrow passage 87 creates a slight pressure drop. It will be recalled that this functions as a fixed orifice. Accordingly, the control pressure is slightly reduced from the intermediate pressure. As an example, it might be 925 psi. This creates a pressure of 925 psi within the chamber 89 acting against the valve element 92. This forms an opening force acting on the valve.

As described to this juncture, the steam within the pilot valve creates three opening forces which are additive to overcome the spring, depending on the setting of the spring. If they do not overcome the force of the spring, no opening occurs. In this example, the dome pressure is 925 psi and this pressure is applied to the larger area of the piston 18 of the safety relief valve 12. The safety relief valve is closed in spite of a line pressure of 1,000 psi dependent on the relative areas of the piston 18.

There must be some small flow of steam through the pilot valve to observe the pressure drops that were mentioned. Restated, if there is no flow, there is no pressure drop through the two orifices. There is inevitably a slight flow due to leakage, condensation and other factors. The steam certainly gives up some heat and thereby experiences a pressure drop with a loss of enthalpy further contributing to the flow.

DIAPHRAGM CONTROL OF STEAM FLOW

Consider for the moment that the exemplary pressures given above prevail within the pilot valve 10. Consider further that the spring 63 is adjusted to maintain the pilot valve in a closed condition. Should the differential across the sense diaphragm 58 increase slightly with an increase in line pressure, it will force the valve stem 57 upwardly. This force is coupled to the stem from the diaphragm 58 eventually to the shoulder supporting the washer 56, thereby enabling the stem to be raised against the force of the spring 63. When this occurs, even a very slight opening will vent some steam to the exhaust port 93. When this occurs, albeit slightly, it creates a flow through the pilot valve which drops the intermediate pressure. The intermediate pressure drop creates a large upward force from the boost diaphragm. This action is relatively rapid, and may be termed instantaneous. This creates a very large opening force on the valve stem 57 and slams it open. This inevitably drops the control pressure. When the control pressure is dropped, the pressure relief valve 12 is opened and drops line pressure. As line pressure is dropped, the opening force acting on the valve stem is reduced with line pressure drop. The two diaphragms (considered as a unit) are exposed to a pressure differential between line pressure and atmospheric pressure. As line pressure is dropped, the valve opening force is reduced. Eventually, it is reduced to the point that the spring 63 overcomes the opening force from the two diaphragms and forces the valve stem 57 downwardly. This closes the exhaust port, and raises the control pressure. The control pressure increase initiates modulation of the safety relief valve toward a closed position. In like fashion, the increase in control pressure in the pilot valve, coupled with the increase in line pressure, establishes modulated conditions in the pilot valve.

STEAM TRAP

The control pressure is applied to the dome area of the safety relief valve. Even in the best of circumstances, some condensate will form in the dome. The piston 18 is constructed with an internal drilled passage through it. This passage is quite small. The passage is from the dome area to the lower end and, of course, is through the bolt 19 which secures the disc 20 in position. This passage functions as a steam trap. Any condensate which collects in the dome area will eventually flow downwardly into this small and narrow passage, and back toward the high pressure area. The droplets of condensate are permitted to trickle downwardly, and are revaporized or otherwise carried away by the steam. This is particularly true in light of the ordinary operating condition whereby the safety relief valve is slightly open and flowing slightly. It will be recalled that the safety relief valve can be open, closed or at some intermediate position. In ordinary applications, the safety relief valve is usually modulated and, therefore, slightly open. The degree of opening depends on quiescent conditions sensed by the pilot valve. Accordingly, there is some flow past the valve seat, and it is sufficient to carry away the condensate from the steam trap. It is important to note that no condensate can collect and thereby block operation of the control pressure to the top end of the piston 18. Further, even should the equipment be shut down in the dead of winter and the condensate in the safety relief valve freeze to ice, there is nevertheless the passage through the piston 18 to relieve blockage in this circumstance.

ICE FORMATION

Pursuing the latter point, assume that the equipment is shut down under winter time conditions and that steam condenses at all points within the apparatus. Assume, for example, that the steam condenses and eventually freezes around the piston 18 at the top end and at the bottom. When the equipment is placed back in service, steam will heat the valve body. Moreover, steam may flow through the narrow passage between the end faces of the piston. The passage is sufficiently small that no unbalance to the operation of the piston occurs. Indeed, the piston may be frozen in any position at that moment. Whatever the case, sufficient heat is liberated from the steam to eventually melt even a large plug of ice.

The same is also true for the pilot valve 10. Even if the pilot valve has been shut down and collected condensate has frozen at many points within it, there is no particular problem from this. For instance, if either orifice has been closed by an ice plug, this simply increases the intermediate pressure. It forces the intermediate pressure sufficiently near line pressure that valve opening will occur. When this does, steam will then be vented through the pilot valve to the exhaust port 93 and the flowing steam will liberate sufficient heat to thaw the entire pilot valve 10, melting any ice, and freeing it for subsequent operation.

The accumulation of condensate in the pilot valve is largely prevented. In those areas which are exposed to steam, condensate flows in the passages where sufficient steam flow occurs, and is sufficiently vaporized to be carried away. Even in the condition of accumulating ice at any point within the pilot valve 10, subsequent operation will free the pilot valve of blockage, and condensate in the pilot flows back into steam lines for disposal. Needless to say, scale factors may vary widely and thereby increase or decrease the rate at which ice melting occurs. The same dependency on scale factors applies to the rate of water removal from the dome via the steam trap. The scale factor dependency also includes steam pressure and temperature.

At reasonable pressures with an adequate diaphragm surface area, the diaphragm construction is the most advantageous. If the pressure is quite high, the diaphragm either can be smaller or is optionally replaced with a simple piston face with a surrounding seal to limit leakage. In this event, both diaphragms can be replaced.

One important advantage of the disclosed apparatus is the small unsupported area of the diaphragms. This is defined as the portion of the diaphragm not supported by the circular plate shaped members 53 and 60. They are preferably chamfered around the outer edges to reduce alignment and canting problems. If the unsupported area is too large, the diaphragm material tends to flow and stretches in the chamfered area. The radial clearance between the circular plates 53 and 60 and their surrounding plates 48 and 59 is held to a minimum, typically so narrow that the diaphragm does not flow into the clearance area adjacent to the member 53 and 60.

One advantage of the present invention is the metal-to-metal seating arrangement in the pilot valve 10. Attention is directed to the members 91 and 92. They are constructed with opposing flat, parallel faces which close on contact. Exhaust flow passes between the two members when the pilot valve 10 is open; there is no flow when the metal-to-metal closure occurs.

While the foregoing is directed to the preferred embodiment of the present invention, other and further embodiments of the invention may be devised without departing from the basic concept thereof, and the scope thereof is determined by the claims which follow.

We claim:

1. A pilot valve for control of a low pressure safety relief valve which safety relief valve is exposed to an inlet pressure wherein the inlet pressure is selectively relieved by operation of the safety relief valve and wherein the pilot valve controls the safety relief valve by selectively applying control pressure to the safety relief valve to close the safety relief valve and, by selectively reducing the control pressure, to open the safety relief valve, the pilot valve comprising:
   (a) a pilot valve body having a chamber therein;
   (b) a valve seat in said valve body chamber;
   (c) movable valve means selectively closing against said valve seat in said valve body;
   (d) diaphragm means having two pressure isolated sides in a chamber in said valve body;
   (e) first means for introducing fluid through an inlet at inlet pressure of the safety relief valve, said first means placing pressure on one side of said diaphragm means to form a force acting on said diaphragm means;
   (f) second means forming an intermediate pressure less than the inlet pressure and introducing fluid at the intermediate pressure against the second side of said diaphragm means;
   (g) wherein said first means and second means form forces selectively moving said diaphragm means on achieving a specified differential force;
   (h) second diaphragm means having two pressure isolated sides received in a chamber in said valve body;
   (i) third means exposing one side of said second diaphragm means to fluid at a pressure between atmospheric pressure and inlet pressure to form a force acting on said second diaphragm means;
   (j) an adjustable resilient means opposing said diaphragm means and said second diahragm means;
   (k) valve stem means connected to said valve means for opening said valve means relative to said valve seat, said valve stem means being operatively coupled to and moved by forces from said adjustable resilient means, diaphragm means and second diaphragm means;
   (l) passage means supplied with inlet pressure and extending to said valve seat and valve means, said passage means additionally connecting with an outlet line from said pilot valve extending to the safety relief valve to conduct control pressure to the safety relief valve for control of opening and closing of said safety relief valve;
   (m) an exhaust passage from said valve seat and said valve means normally closed by said valve means for selectively dropping pressure in said outlet line by opening a flow path through said exhaust passage;
   (n) orifice means upstream of said outlet line forming a pressure drop dependent on fluid flow through said orifice means; and
   (o) said orifice means and said valve seat and valve means modifying the control pressure applied to the safety relief valve to open and close the safety relief valve.

2. The apparatus of claim 1 wherein the safety relief valve includes:
   (a) a piston with upper and lower faces wherein the lower face has a smaller area than the upper face;
   (b) valve seat means cooperatively closing against the smaller, lower face of said piston to selectively prevent flow of pressure fluid through the safety relief valve;
(c) a closed chamber exposing the upper face of said piston to control pressure from said outlet line; and
(d) a constricted flow passage extending between the upper and lower faces of said piston.

3. The apparatus of claim 2 wherein said valve seat means comprises a circular, rigid face contacting a resilient ring member co-acting therewith to seal against pressure fluid flow therepast.

4. The apparatus of claim 3 wherein said ring member is received in a groove means on said piston.

5. The apparatus of claim 4 wherein said groove means captures said ring member in an undercut area and positions an exposed face portion of said ring member for sealing contact.

6. The apparatus of claim 2 including a sleeve sealingly surrounding said piston and defining a chamber for said upper face, and further positioning said piston for sliding movement toward said valve seat means.

7. The apparatus of claim 1 wherein said orifice means comprises an adjustable orifice exposed to inlet pressure and which adjustable orifice is in said passage means upstream of said valve seat and valve means.

8. The apparatus of claim 7 further including a second, serially located orifice in said passage means, and control pressure is defined by fluid flow through said adjustable orifice and said second orifice.

9. The apparatus of claim 8 wherein said valve seat and valve means are downstream of both of said orifices; and
said valve seat and valve means prevent flow to said exhaust passage on closing.

10. The apparatus of claim 1 wherein said diaphragm means and second diaphragm means are positioned in chambers in said valve body in spaced, parallel positions defining, with said valve body, isolated first and second pressure chambers;
said first pressure chamber receiving inlet pressure from said first means;
said second pressure chamber receiving the intermediate pressure from said second means;
wherein said second pressure chamber is exposed to faces of said diaphragm means and said second diaphragm means;
connective means transferring movement of said diaphragm means and second diaphragm means to said valve stem means; and
wherein said valve stem means is moved in one direction by said diaphragm means or said second diaphragm means and is moved in the opposite direction by said resilient means.

11. The apparatus of claim 10 wherein said connective means comprises a common circular disc adjacent to spaced, parallel deflectable first and second diaphragms comprising said diaphragm means and second diaphragm means, and said disc is moved by both of said diaphragms; and said first diaphragm separates said first and second pressure chambers.

12. The apparatus of claim 11 wherein said disc has upper and lower faces contacting said first and second diaphragmms, and said disc is chamfered around its peripheral edge to define an unsupported area adjacent said first and second diaphragms extending to an annular clearance around said disc sufficiently small to enable said disc to move without pinching said first or second diaphragm between said disc and said valve body around said disc.

13. The apparatus of claims 10 or 11 wherein first pressure chamber receives inlet pressure;
said second pressure chamber receives an intermediate pressure; and
said second diaphragm is opposed on a remaining face by atmospheric pressure.

14. The apparatus of claim 9 wherein said disc is centrally positioned around said valve stem means, and said valve stem means comprises an elongate axially movable shaft having a shoulder thereon, and said shoulder supports said disc; and
said shoulder and said disc cooperatively capturing one of said diaphragms therebetween, and wherein one end of said shaft is selectively pulled by an external overriding, hand operable valve opening means.

* * * * *